United States Patent [19]
Ishikawa

[11] 4,224,555
[45] Sep. 23, 1980

[54] ELECTRONIC FLASH WITH AUTOMATIC DURATION CONTROL

[75] Inventor: Katsuji Ishikawa, Osaka, Japan

[73] Assignee: West Electric Co., Ltd., Osaka, Japan

[21] Appl. No.: 923,963

[22] Filed: Jul. 12, 1978

[30] Foreign Application Priority Data

Jul. 18, 1977 [JP] Japan .................................. 52-86363

[51] Int. Cl.³ .......................................... H05B 41/32
[52] U.S. Cl. .................................. 315/151; 315/241 P
[58] Field of Search .................... 315/151, 159, 241 P; 354/33, 128, 145

[56] References Cited

U.S. PATENT DOCUMENTS

| | | | |
|---|---|---|---|
| 3,754,162 | 8/1973 | Katayama | 315/241 P |
| 3,783,336 | 1/1974 | Vital et al. | 315/159 |
| 3,808,500 | 4/1974 | Ludloff | 315/241 P |
| 3,818,266 | 6/1974 | Vital et al. | 315/151 |

FOREIGN PATENT DOCUMENTS

2019721 10/1971 Fed. Rep. of Germany ........ 315/241 P

*Primary Examiner*—Eugene R. LaRoche
*Attorney, Agent, or Firm*—Burgess, Ryan and Wayne

[57] ABSTRACT

In an electronic flash of the type having a main flash capacitor, a trigger circuit, a flash lamp which is ignited by a trigger voltage from the trigger circuit and flashed by the discharge of electrical energy stored in the main flash capacitor, a light reception circuit for integrating the amount of light reflected back from a subject and a flash duration control circuit or a flash interruption circuit actuable when the amount of light integrated by the light reception circuit reaches a predetermined level, a DC power source is connected to the light reception circuit through a switching means which is enabled or closed in response to the flashing of the flash lamp, whereby the erratic operation of the light reception circuit due to the integration of light other than the flash of light reflected from the subject may be avoided.

2 Claims, 12 Drawing Figures

4,224,555

ELECTRONIC FLASH WITH AUTOMATIC DURATION CONTROL

BACKGROUND OF THE INVENTION

The present invention relates to an electronic flash capable of automatic flash duration control and more particularly an electronic flash having a main flash capacitor, a trigger circuit, a flash lamp which is triggered by a trigger voltage from the trigger circuit and converts the electrical energy stored in the main flash capacitor into a flash of light, a light reception circuit for integrating the amount of light reflected back from a subject exposed by the flash of light and a flash duration control circuit or a flash interruption circuit for interrupting the flashing of the flash lamp when the amount of reflected light integrated by the light reception circuit reaches a predetermined level.

When the electronic flash of the type described receives light other than reflected back from a subject exposed by a flash of light prior to the time the flash lamp is flashed, the erratic integration of light occurs in the light reception circuit.

In order to overcome this problem, there has been devised and demonstrated an electronic flash of the type described in U.S. Pat. No. 3,818,266. In this electronic flash, in addition to the main flash capacitor an additional capacitor is provided which is discharged through the flash lamp, a resistor and a constant voltage element such as a zener diode simultaneously when the flash lamp is flashed, and a constant voltage across the constant voltage element is supplied to the light reception circuit to actuate the same.

The voltage across the constant voltage element is supplied to the light reception circuit before the flash lamp is flashed so that the erratic operation of the light reception circuit due to light other than light reflected back from the subject exposed by a flash of light may be avoided.

However, when the flash lamp is flashed, the trigger voltage has not been sufficiently damped yet so that the erratic operation results. The trigger voltage is a high frequency voltage at hundreds of thousands of hertz to a few megahertz so that when the high-frequency voltage is not sufficiently damped, the light reception circuit integrates light other than light reflected back from the subject exposed by a flash of light and consequently the accurate integration of light cannot be attained.

SUMMARY OF THE INVENTION

One of the objects of the present invention is therefore to provide an electronic flash which may eliminate the erratic operation of the light reception circuit, thereby accurately controlling a flash duration.

Briefly stated, the present invention provides an electronic flash comprising a main flash capacitor, a trigger circuit, a flash lamp which is ignited by the trigger circuit so as to convert the electrical energy stored in the main flash capacitor into a flash of light, a light reception circuit for integrating light reflected from a subject exposed by the flash of light and generating the output signal when the amount of reflected light integrated reaches a predetermined level, a flash duration control circuit or a flash interruption circuit actuable in response to the output signal from the light reception circuit for causing the flash lamp to interrupt flashing, a DC power source for supplying a DC voltage to said light reception circuit for actuating the same, a switching means for connecting said DC power source to the light reception circuit and disconnecting the DC power source therefrom, and a voltage generating circuit actuable in response to the flashing of the flash lamp for generating an enable voltage in response to which the switching means is enabled so as to connect the DC power source to the light reception circuit.

BRIEF DESCRIPTION OF THE DRAWINGS

Similar reference numerals are used to designate similar parts throughout the FIGS.

DESCRIPTION OF THE PREFERRED EMBODIMENTS

Figure 1:
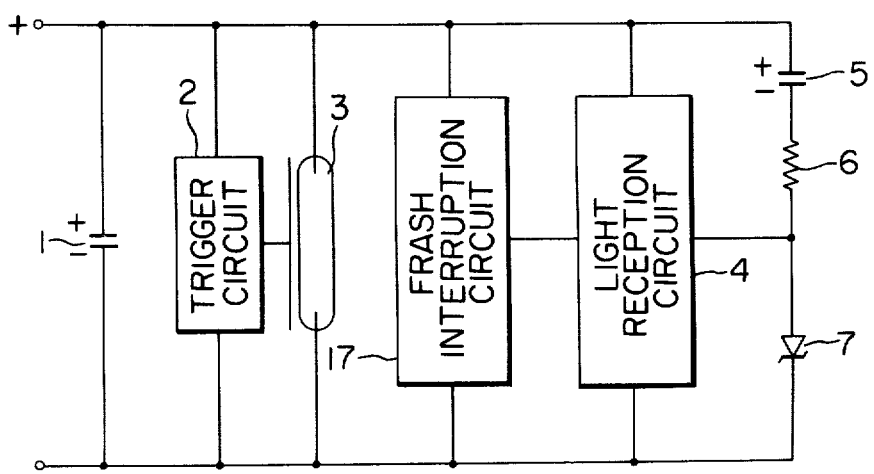
FIG. 1 is a circuit diagram of a prior art electronic flash.
Figure 2:
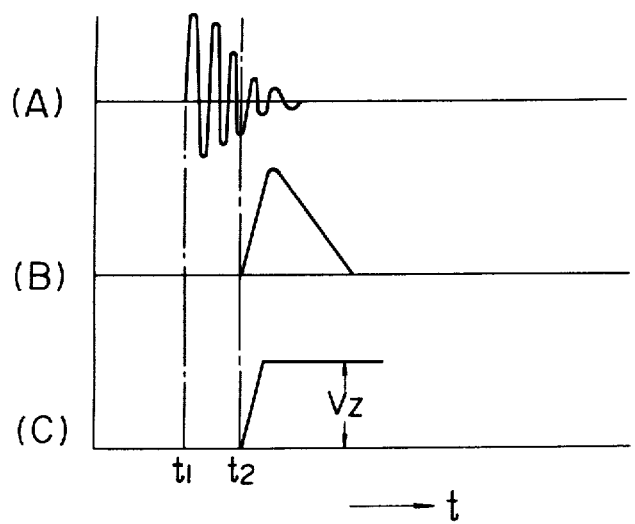
FIG. 2(A) shows the waveform of the trigger voltage generated by a trigger circuit 2 shown in FIG. 1.
FIG. 2(B) shows the waveform of a flash of light produced by a flash lamp 3 shown in FIG. 1.
FIG. 2(C) shows the waveform of the voltage supplied to a light reception circuit 4 shown in FIG. 1.

Prior Art, FIGS. 1 and 2

Prior the description of the preferred embodiments of the present invention, a prior art electronic flash will be described briefly in order to distinctly and specifically point out the problems thereof. FIG. 1 shows an electronic flash of the type disclosed in U.S. Pat. No. 3,818,266. A light reception circuit 4 which generates the flash duration control signal or the flash interruption signal to be applied to a flash duration control circuit or a flash interruption circuit 17 is supplied with a voltage across a constant voltage element 7. That is, when a flash lamp 3 is triggered with the trigger voltage (See FIG. 2A) from a trigger circuit 2, it is flashed by the discharged of a main flash capacitor 1 and the electrical energy stored in a capacitor 5 with the polarities shown is discharged through a resistor 6, the constant voltage element 7 and the flash lamp 3. The voltage (See FIG. 2C) across the constant voltage element 7 which is constant is supplied to the light receiption circuit 4.

Since the light reception circuit 4 is supplied with the voltage prior to flashing of the flash lamp 3 due to the capacitor discharge, an erratic operation of the light reception circuit 4 due to the reception of light other than a flash of light emitted from the flash lamp 3 may be prevented.

However, as shown in FIG. 2, the trigger voltage which is started at a time $t_1$ is not sufficiently damped at a time $t_2$ when the capacitor discharge through the flash lamp 3 is started so that an erratic operation results. That is, the trigger voltage is a high frequency voltage at hundreds of thousands to a few million hertz. Therefore due to the high frequency voltage which is not sufficiently damped, the integration is started in response to light other than light reflected back from a subject. In other words, the accurate integration of the light reflected back from the subject cannot be attained.

Figure 3:
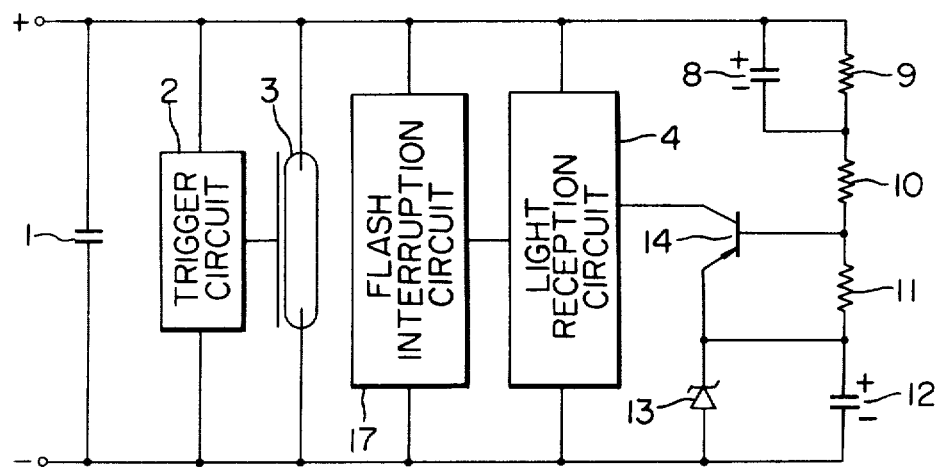
FIG. 3 is a circuit diagram of a first embodiment of an electronic flash in accordance with the present invention.
Figure 4:
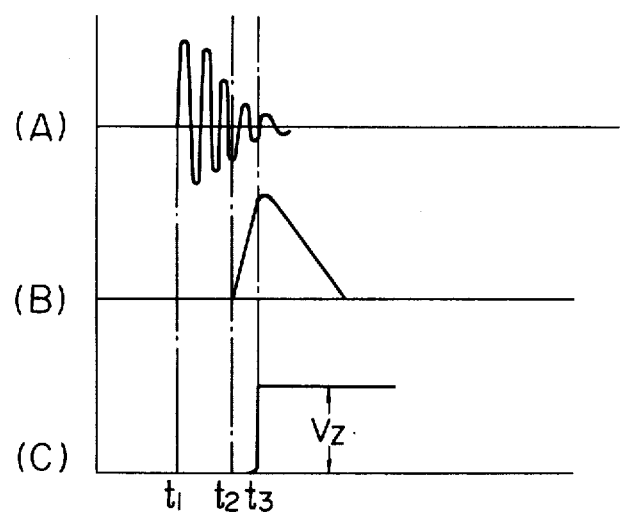
FIG. 4(A) shows the waveform of the trigger voltage generated by the trigger circuit 2 shown in FIG. 3.
FIG. 4(B) shows the waveform of a flash of light produced by the flash lamp 3 shown in FIG. 3.
FIG. 4(C) shows the waveform of the voltage supplied to the light reception circuit 4 shown in FIG. 3.

First Embodiment, FIGS. 3 and 4

Referring to FIG. 3, until the flash lamp 3 is flashed, a capacitor 8 is charged with a voltage which is derived by the division of a supply voltage by resistors 9, 10 and 11 and a constant voltage element 13 while a capacitor 12 is charged with a voltage across the constant voltage element 13. When the flash lamp 3 is ignited by the trigger circuit 2, it is flashed by the discharge of electrical energy stored in the main flash capacitor 1 and the capacitor 8 is discharged through the flash lamp 3, the constant voltage element 13 and the resistors 11 and 10 so that the voltage drop across the resistor 11 results.

When the voltage across the resistor 11 exceeds the base potential of a transistor 14, the latter is enabled so that the voltage charged across the capacitor 12 is supplied to the light reception circuit 4.

Referring to FIG. 4, when the flash lamp 3 is applied with the trigger voltage at a time $t_1$ as shown in FIG. 4(A), the discharge current starts to flow through the flash lamp 3 at a time $t_2$ as shown in FIG. 4(B). At a time $t_3$, the voltage across the capacitor 12 is almost instantaneously supplied to the light reception circuit 4 as shown in FIG. 4(C). That is, the time when the voltage is supplied to the light reception circuit 4 is delayed by $(t_3-t_2)$ from the time when the flash lamp 3 starts flashing. At the time $t_3$ the trigger voltage has been sufficiently damped as shown in FIG. 4(A) to such an extent that it will not adversely affect the operation of the light reception circuit 4. Thus, the erratic operation of the light reception circuit 4 due to the trigger voltage may be completely avoided.

In case of the prior art electronic flash shown in FIG. 1, it takes some time before the voltage supplied to the light reception circuit 4 reaches its peak value as shown in FIG. 2(C), but according to the present invention the voltage rises instantaneously to a peak value Vz as shown in FIG. 4(C) so that the accurate and reliable operation of the light reception circuit 4 may be ensured. More particularly, in case of the prior art electronic flash, the erratic operation of the light reception circuit 4 is caused before the voltage reaches its peak value Vz, but according to the present invention the voltage to the circuit 4 instantaneously rises to its peak value Vz at the time $t_3$ so that the circuit 4 may be always supplied with a predetermined voltage and consequently its erratic operation may be completely prevented.

As soon as the light reception circuit 4 has been supplied with the voltage Vz, the integration of light reflected from a subject is started. When the integrated amount of light reaches a predetermined level, the light reception circuit 4 generates the output signal in response to which the flash duration control circuit or the flash interruption circuit 17 is actuated to interrupt the flashing of the flash lamp 3.

The time $t_3$ when the voltage across the capacitor 12 is supplied to the light reception circuit 4 is dependent upon a time when the voltage drop across the resistor 11 reaches a predetermined level due to the discharge of the capacitor 8. Therefore the time $t_3$ may be suitably adjusted by the selection of suitable values of the capacitor 8 and the resistors 10 and 11.

Figure 5:
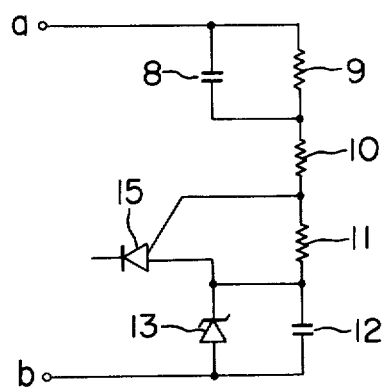
FIGS. 5 and 6 are circuit diagrams of second and third embodiments, respectively, of the present invention.

Second Embodiment, FIG. 5

In the second embodiment shown in FIG. 5, instead of the transistor 14, an N-gate thyristor 15 is used. When the voltage drop across the resistor 11 due to the discharge of the capacitor 8 reaches a predetermined level, the thyristor 15 is enabled so that the voltage across the capacitor 12 may be instantaneously applied to the light reception circuit 4. In FIG. 5, terminals a and b are connected across the light reception circuit 4.

Figure 6:
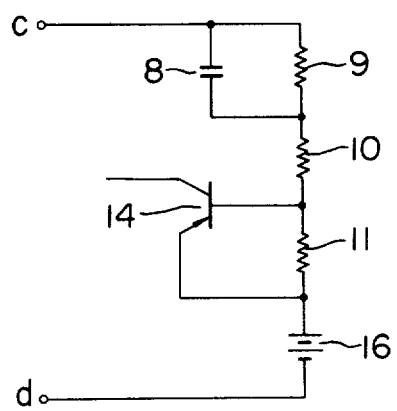

Third Embodiment, FIG. 6

In the third embodiment shown in FIG. 6, the constant voltage element 13 is eliminated and instead of the capacitor 12 a DC power source 16 is connected. The capacitor 8 is discharged through the flash lamp (See FIG. 3), the DC power source 16 and the resistors 11 and 10. When the voltage drop across the resistor 11 due to this discharge reaches a predetermined level, the transistor 14 is enabled so that the DC power source 16 is connected to the light reception circuit. Terminals c and d are connected across the light reception circuit 4 (See FIG. 3).

What is claimed is:

1. An electronic flash, comprising:
    (a) a flash duration control circuit for interrupting the flashing of a flash lamp, said flash duration control circuit being actuated when the amount of light emitted by said flash lamp due to the discharge of electrical energy stored in a main flash capacitor initiated by the impression of a trigger voltage upon said flash lamp by a trigger circuit and reflected back from a subject and intercepted by a light reception circuit reaches a predetermined level,
    (b) a DC power source for supplying a desired constant voltage,
    (c) a switching means having two main electrodes and a control electrode for connecting said DC power source to said light reception circuit, and
    (d) a voltage generating circuit actuable in response to the flashing of said flash lamp and including a voltage divider for provding an enable voltage to said control electrode to cause said switching means to connect said DC power source to said light reception circuit, said voltage generating circuit comprising:
        (a) a parallel circuit consisting of a first resistor and a capacitor,
        (b) a second resistor connected in series with said parallel circuit, and
        (c) a constant voltage element connected in series with said second resistor, so that the voltage across said second resistor is applied to the control electrode of said switching means.

2. An electronic flash as set forth in claim 1 wherein said DC power source comprises:
    (a) a constant voltage element, and
    (b) a capacitor connected in parallel with said constant voltage element.

* * * * *